(12) United States Patent
Takakura

(10) Patent No.: US 10,352,748 B2
(45) Date of Patent: Jul. 16, 2019

(54) FLOW RATE MEASURING DEVICE

(71) Applicant: HORIBA STEC, Co., Ltd., Kyoto-shi, Kyoto (JP)

(72) Inventor: Hiroshi Takakura, Kyoto (JP)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 282 days.

(21) Appl. No.: 15/193,970

(22) Filed: Jun. 27, 2016

(65) Prior Publication Data

US 2017/0003691 A1 Jan. 5, 2017

(30) Foreign Application Priority Data

Jun. 30, 2015 (JP) .................................. 2015-132013

(51) Int. Cl.
*G01F 1/00* (2006.01)
*G01F 1/86* (2006.01)
(Continued)

(52) U.S. Cl.
CPC .................. *G01F 1/86* (2013.01); *G01F 1/88* (2013.01); *G01F 15/06* (2013.01)

(58) Field of Classification Search
CPC ....................................................... G01F 1/86
(Continued)

(56) References Cited

U.S. PATENT DOCUMENTS

| 6,052,076 A | 4/2000 | Patton, III et al. |
| 2004/0046682 A1* | 3/2004 | Paquet ................ H03M 1/0863 341/144 |

(Continued)

FOREIGN PATENT DOCUMENTS

| CN | 1636322 A | 7/2005 |
| JP | 09116438 A | 5/1997 |

(Continued)

OTHER PUBLICATIONS

Japanese Patent Office, Decision to Grant a Patent Issued in Application No. 2015132013, dated Feb. 12, 2019, 6 pages.

(Continued)

*Primary Examiner* — Toan M Le
*Assistant Examiner* — Xiuqin Sun
(74) *Attorney, Agent, or Firm* — Alleman Hall Creasman & Tuttle LLP

(57) ABSTRACT

To achieve both response speed and accuracy required for a flow rate measuring device without sacrificing the simplicity and inexpensiveness of a PWM type D/A converter, the flow rate measuring device includes an analog conversion part adapted to convert a digital signal indicating a measured flow rate value to an analog signal. In addition, the analog conversion part includes: a PWM signal generating circuit that can output three or more specified voltages is configured to, on the basis of the measured flow rate value indicated by the digital signal, select two adjacent voltages, as well as on the basis of the measured flow rate value indicated by the digital signal, set a duty ratio to generate a PWM signal of which a high level and a low level are the two selected voltages, respectively; and a conversion circuit that smooths the PWM signal to convert to the analog signal.

7 Claims, 15 Drawing Sheets

(51) Int. Cl.
*G01F 1/88* (2006.01)
*G01F 15/06* (2006.01)

(58) Field of Classification Search
USPC .......................................................... 702/45
See application file for complete search history.

(56) References Cited

U.S. PATENT DOCUMENTS

| | | | | |
|---|---|---|---|---|
| 2012/0201236 A1* | 8/2012 | Jourdain | ................... | H03L 7/08 |
| | | | | 370/350 |
| 2013/0150813 A1* | 6/2013 | Gordon | ............... | A61M 1/0001 |
| | | | | 604/318 |
| 2017/0003691 A1* | 1/2017 | Takakura | .................. | G01F 1/86 |

FOREIGN PATENT DOCUMENTS

| | | | |
|---|---|---|---|
| JP | 2002090196 | A | 3/2002 |
| JP | 2003273026 | A | 9/2003 |
| JP | 2004056854 | A | 2/2004 |
| JP | 2006067481 | A | 3/2006 |
| JP | 3828821 | B2 | 10/2006 |
| WO | 105036 | A2 | 1/2001 |

OTHER PUBLICATIONS

China National Intellectual Property Administration, Office Action and Search Report Issued in Application No. 201610486967.4, dated May 27, 2019, 15 pages.

* cited by examiner

US 10,352,748 B2

FLOW RATE MEASURING DEVICE

TECHNICAL FIELD

The present invention relates to a flow rate measuring device adapted to measure the flow rate of fluid such as a gaseous material or a liquid material used for semiconductor manufacturing.

BACKGROUND ART

A flow rate measuring device of recent years is adapted to calculate a measured flow rate by A/D converting sensor signal values from various sensors (such as pressure and temperature sensors) for identifying a flow rate, and then operating the digitized sensor signal values with software using a CPU.

The measured flow rate obtained in this manner has of course a digital value; however, depending on a user, there is a demand to obtain the measured flow rate as an analog signal.

In order to convert the digital value into the analog signal to respond to such a demand, a D/A converter is used.

Among many D/A converters, one that can be easily and inexpensively configured using a pulse width modulation (PWM) output function normally included in a CPU is a PWM type D/A converter.

The CPU can output a PWM signal having a duty ratio corresponding to a digital value indicating a measured flow rate. Also, the PWM type D/A converter is one that smooths the PWM signal through a lowpass filter to convert to an analog signal.

However, this method has the following problems.

A first problem is one between residual ripple and response speed occurring when passing the PWM signal through the lowpass filter. When reducing the ripple to increase the time constant of the lowpass filter in order to stabilize an analog signal value, a problem of deteriorating the response speed to prevent a change in measured flow rate from being immediately reflected in a change in analog signal value occurs. Between the reduction in ripple and the improvement in response speed, there is a tradeoff relationship, and it has been considered that simultaneously achieving the both is difficult.

A second problem is that even though a PWM output voltage from the CPU changes between a digital power supply voltage and a digital common voltage, the digital power supply voltage and the digital common voltage are low in voltage accuracy and easily changed by the effect of noise or the like. Since the analog signal is obtained by smoothing the PWM signal having the unstable high level and low level voltages, the value of the analog signal also follows the PWM signal and is thereby destabilized, which serves as a bottleneck to make it difficult to obtain a highly accurate analog output value.

In addition, the above-described two problems become particularly significant in a flow rate measuring device used for applications such as a semiconductor process of recent years. This is because the flow rate measuring device used for such applications requires accuracy necessary for measuring a minute flow rate or a change in minute flow rate, and also requires high response speed in order to increase throughput.

CITATION LIST

Patent Literature

Patent Literature 1: JP-A2003-273026

SUMMARY OF INVENTION

Technical Problem

The present invention is made in order to solve the above-described problems at once, and intends to achieve both response speed and accuracy required for a flow rate measuring device without sacrificing the simplicity and inexpensiveness of the PWM type D/A converter.

Solution to Problem

A flow rate measuring device according to the present invention includes an analog conversion part adapted to convert a digital flow rate signal indicating a measured flow rate value to an analog flow rate signal indicating the measured flow rate value. In addition, the analog conversion part includes: a PWM signal generating circuit that can output three or more predetermined specified voltage levels, and on the basis of the measured flow rate value indicated by the digital flow rate signal, selects two specified voltage levels from among the specified voltage levels, as well as on the basis of the measured flow rate value indicated by the digital flow rate signal, setting a duty ratio to generate a PWM signal of which a high level and a low level are the two specified voltage levels, respectively; and a conversion circuit that smooths the PWM signal outputted from the PWM signal generating circuit to convert to the analog flow rate signal.

Note that the term "PWM signal" herein refers to a broad-sense PWM signal, and is assumed to include, in addition to a PWM signal having a constant period as a narrow-sense PWM signal, a PWM signal having a variable period as well.

In such a configuration, the difference between the high and low levels of the PWM signal decreases depending on the number of the specified voltage levels to decrease the variation width of the PWM signal, and therefore residual ripple voltage also decreases along with the decrease in variation width. Accordingly, the effect of the ripple can be reduced without sacrificing output response speed.

When the specified voltage levels are set on the basis of an analog constant voltage and an analog common voltage set separately from a digital power supply voltage and a digital common voltage, the high and low levels of the PWM signal to be outputted are stabilized, and therefore the analog flow rate signal with higher accuracy can be obtained.

When the PWM signal generating circuit selects two adjacent specified voltage levels, the variation width between the high and low levels of any PWM signal to be outputted can be decreased, and therefore the effect of the present invention, in other words, a reduction in ripple can be made remarkable. Further, when the adjacent specified voltage levels are all substantially equally set, the variation width between the high and low levels of any PWM signal to be outputted can be minimized, and therefore the effect can be made further remarkable.

More specific embodiments include one in which the PWM signal generating circuit includes: a primary PWM signal generating circuit that on the basis of a value of the digital flow rate signal, generates a primary PWM signal, and selects two specified voltage level from among the three or more specified voltage levels; and a secondary PWM signal generating circuit that can output the three or more specified voltage levels, and generates a secondary PWM signal as the PWM signal obtained by converting a high level and a low level of the primary PWM signal to the two specified voltage levels, respectively.

Depending on the balance between the output impedance of the PWM signal generating circuit and the input impedance of the conversion circuit, the time constant of the conversion circuit may change to prevent the linearity between the measured flor rate and the duty ratio of the PWM signal from being kept. In order to solve this with software, preferably, the PWM signal generating circuit is one that sets the duty ratio with as a parameter, a variation in smoothing time constant of the conversion circuit occurring depending on the balance between the output impedance of the PWM signal generating circuit and the input impedance of the conversion circuit.

Regardless of whether or not the balance between the output impedance of the PWM signal generating circuit and the input impedance of the conversion circuit is kept, generalizing a method for setting adjacent specified voltage levels and the duty ratio in the PWM signal generating circuit under conditions such as the accuracy of the analog flow rate signal meeting a specification results as follows.

That is, the PWM signal generating circuit: compares a value q of the digital flow rate signal and the specified voltage levels $V_0, V_1, \ldots, V_k, \ldots, V_n$ (n is an integer equal to or more than 2, and $V_k > V_{k-1}$); searches for j meeting $V_j \geq s \cdot q > V_{j-1}$ (j is an integer not less than 1 and not more than n, and s is a predetermined coefficient); and outputs the PWM signal having a duty ratio $(s \cdot q - V_{j-1})/(V_j - V_{j-1})$, a low level $V_{j-1}$, and a high level $V_j$.

When the balance between the output impedance of the PWM signal generating circuit and the input impedance of the conversion circuit is not sufficiently kept, preferably, the PWM signal generating circuit sets the duty ratio of the PWM signal to a value shifted from $(s \cdot q - V_{j-1})/(V_j - V_{j-1})$ on the basis of the variation in smoothing time constant of the conversion circuit occurring depending on the balance between the output impedance of the PWM signal generating circuit and the input impedance of the conversion circuit.

The flow rate measuring device may be equipped in a flow rate controller.

Also, the present invention can be applied not only to the flow rate measuring device but also broadly to a digital-analog conversion device. In this case, the present invention includes an analog conversion part adapted to receive a digital signal and convert to an analog signal indicating a value of the digital signal, in which the analog conversion part includes: a PWM signal generating circuit that can output three or more predetermined specified voltage levels, and on the basis of the value indicated by the digital signal, selects two specified voltage levels from among the specified voltage levels, as well as on the basis of the value indicated by the digital signal, setting a duty ratio to generate a PWM signal of which a high level and a low level are the two specified voltage levels, respectively; and a conversion circuit that smooths the PWM signal outputted from the PWM signal generating circuit to convert to the analog signal. As the value of the digital signal, a value related to flow rate measurement or flow rate control of fluid, i.e., the component density of the fluid, the temperature of the fluid, the opening level of a valve, a fluid pressure, or the like can be cited.

Advantageous Effects of Invention

According to the present invention, since the difference between the high and low levels of the PWM signal decreases depending on the number of specified voltage levels, and a residual ripple voltage in the analog flow rate signal correspondingly decreases, the analog flow rate signal with high accuracy can be obtained without sacrificing output response speed. Also, since when the specified voltage levels are set on the basis of the analog constant voltage and the analog common voltage set separately from the digital power supply voltage and the digital common voltage, the high and low levels of the PWM signal to be outputted are stabilized, the analog flow rate signal with higher accuracy can be obtained.

DESCRIPTION OF EMBODIMENTS

Figure 1:
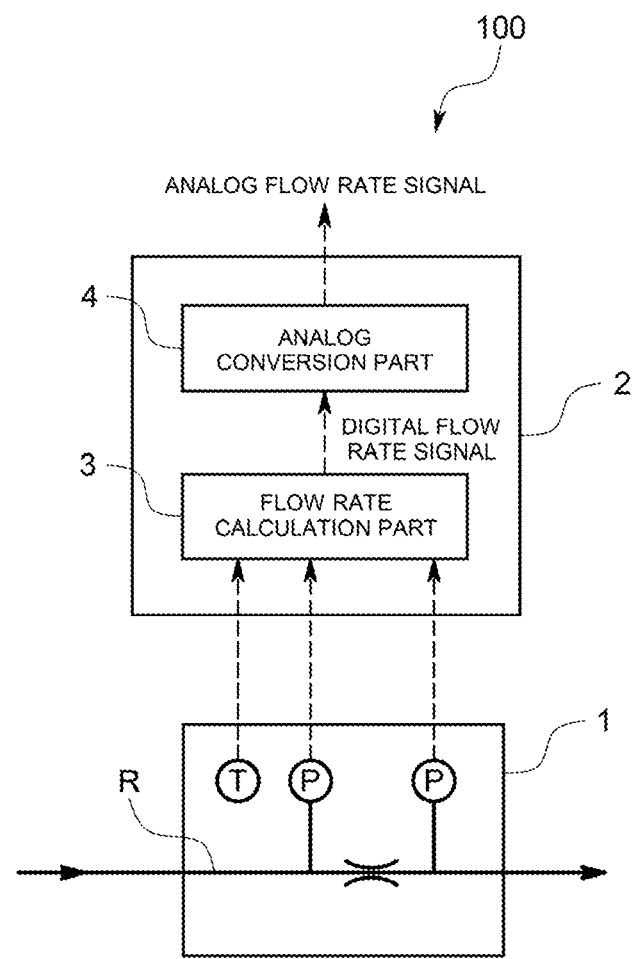
FIG. 1 is a schematic diagram illustrating a flow rate measuring device in one embodiment of the present invention.

A flow rate measuring device 100 of the present embodiment is one adapted to, for example, measure the flow rate of a gaseous material used in a semiconductor manufacturing apparatus, and as illustrated in FIG. 1, includes: a flow rate sensor main body 1 mainly consisting of sensors for flow rate measurement; and an information processor 2 that receives sensor output signals from the flow rate sensor main body 1 to calculate a measured flow rate from the values of the sensor output signals.

The flow rate sensor main body 1 is one of a differential pressure type having components such as: an internal flow path R through which the gaseous material as a flow rate measuring target flows; fluid resistive elements (such as orifices) provided in the internal flow path R; pressure sensors P provided before and after the fluid resistive elements; and a temperature sensor T for measuring a fluid temperature. Note that as the flow rate sensor main body, a thermal type one or another type one may be used.

The information processor 2 is one that is configured as a digital/analog mixed circuit including a CPU, an A/D converter, a memory, and the like, and as illustrated in FIG. 1, includes a flow rate calculation part 3 adapted to digitize pressure- and temperature-related output signals from the flow rate sensor main body 1 through the A/D converter, then perform an operation provided in a predetermined program on the values of the respective digitized output signals to thereby calculate/measure a flow rate, and generate a digital flow rate signal indicating the value of the measured flow rate.

The flow rate calculation part 3 is one adapted to successively calculate the flow rate at predetermined sampling intervals. The calculated measured flow rates are outputted into the memory, and the values thereof are successively stored and, for example, displayed on an unillustrated display in a digital or graphic manner. Note that describing an expression for the above-described operation is omitted here.

In addition, the information processor 2 in the present embodiment further includes an analog conversion part 4 adapted to convert the digital flow rate signal to an analog flow rate signal.

Figure 2:
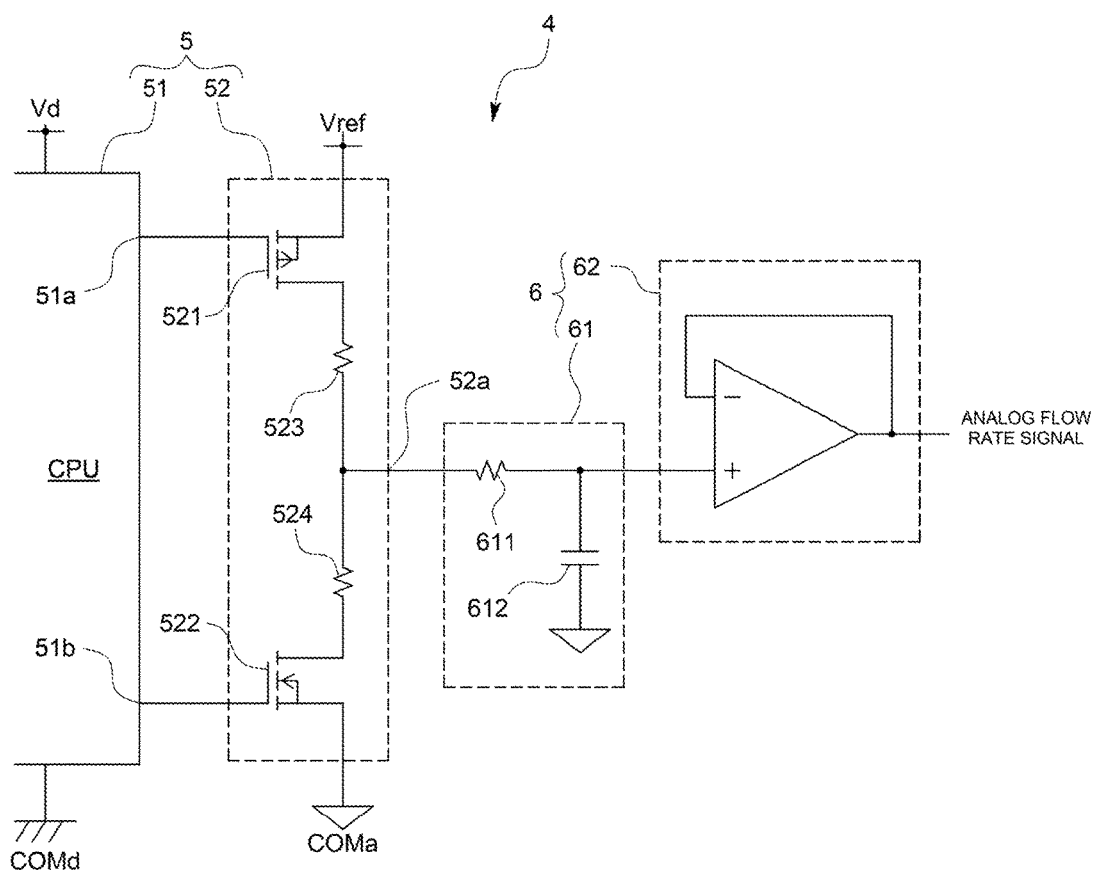
FIG. 2 is an electric circuit diagram illustrating an analog conversion part in the same embodiment.

The analog conversion part 4 is one that as illustrated in FIG. 2, includes: a PWM signal generating circuit 5 adapted to generate a PWM signal (secondary PWM signal) on the basis of the value of the measured flow rate indicated by the digital flow rate signal; and a conversion circuit 6 adapted to smooth the secondary PWM signal to convert to the analog flow rate signal.

The PWM signal generating circuit 5 is one including: a primary PWM signal generating circuit 51 that generates a primary PWM signal having a duty ratio (a duty ratio setting algorithm will be described later) determined by the value of the measured flow rate; and a secondary PWM signal generating circuit 52 that has three predetermined specified voltage levels and generates the secondary PWM signal by converting the high and low levels of the primary PWM signal to two adjacent specified voltage levels selected from among the three specified voltage levels.

The primary PWM signal generating circuit 51 belongs to a digital circuit system connected to a digital power supply (voltage $V_d$) and a digital common $COM_d$, and here the CPU activated in accordance with a predetermined program plays a role as the primary PWM signal generating circuit 51. The CPU used in this embodiment is one having first and second PWM signal output ports 51a and 51b capable of outputting a PWM signal having a designated duty ratio.

In addition, the primary PWM signal generating circuit 51 generates the primary PWM signal having the duty ratio (a duty ratio setting algorithm will be described later) determined by the value of the measured flow rate as described above, and outputs it from any of the PWM signal output ports 51a and 51b. The high level of the primary PWM signal corresponds to the digital power supply voltage $V_d$, and the low level of the primary PWM signal corresponds to a voltage of the digital common $COM_d$. Note that when the CPU does not have a PWM signal output function, a publicly known circuit adapted to generate the PWM signal from, for example, an analog triangular wave may be used.

In the primary PWM signal generating circuit 51, the primary PWM signal is outputted from only any one 51a (51b) of the two PWM signal output ports 51a and 51b, and from the other PWM signal output port 51b (51a), a selection signal fixed to high or low (a duty ratio of 100% or 0%) is outputted. Which of PWM signal output port 51a and 51b outputs the primary PWM signal is provided in the program so as to be determined by the value of the measured flow rate.

The secondary PWM signal generating circuit 52 belongs to an analog circuit system, and includes: a pair of switching elements 521 and 522 (here P and N-type MOSFETs) arranged in series between an analog constant voltage source (voltage $V_{ref}$) and an analog common $COM_a$ (voltage $V_{com}$); and a pair of electric resistive elements 523 and 524 that is provided in series between the switching elements 521 and 522 to generate an intermediate voltage $V_m=(V_{ref}-V_{com})/2$, and has mutually the same value. Note that the voltage $V_{ref}$ of the analog constant voltage source is here set to a value equal to or slightly smaller than the digital power supply voltage $V_d$, but is not limited to this.

To give a description more specifically, the first switching element 521 is one of which a first terminal (the source terminal of the P-type MOSFET) is connected to the analog constant voltage source, a second terminal (the drain terminal of the P-type MOSFET) is connected to one end of the first resistive element 523, and a control terminal (the gate terminal of the P-type MOSFET) is connected to the first PWM signal output port 51a.

The second switching element 522 is one of which a first terminal (the drain terminal of the N-type MOSFET) is connected to one end of the second resistive element 524, a second terminal (the source terminal of the N-type MOSFET) is connected to the analog common $COM_a$, and a control terminal (the gate terminal of the B-type MOSFET) is connected to the second PWM signal output port 51b.

In addition, the connecting line connecting between the resistive elements 523 and 524 serves as an output port 52a of the secondary PWM signal generating circuit 52.

In the secondary PWM signal generating circuit 52 having such a configuration, for example, when the first switching element 521 is ON (the first PWM signal output port 51a is at the low level), and the second switching element 522 is OFF (the second PWM signal output port 51b is at the low level) (see FIG. 3), a voltage at the output port 52a is equal to the voltage $V_{ref}$ of the analog constant voltage source.

Also, when the first switching element 521 is OFF (the first PWM signal output port 51a is at the high level), and the second switching element 522 is ON (the second PWM signal output port 51b is at the high level) (see FIG. 4), the voltage at the output port 52a is equal to the voltage $V_{com}$ of the analog common $COM_a$.

Further, when the first switching element 521 is ON (the first PWM signal output port 51a is at the low level), and the second switching element 522 is ON (the second PWM signal output port 51b is at the high level) (see FIG. 5), the voltage at the output port 52a takes just the intermediate value $V_m=(V_{ref}-V_{com})/2$ between the voltage $V_{ref}$ of the analog constant voltage source and the voltage $V_{com}$ of the analog common $COM_a$.

Figure 3:
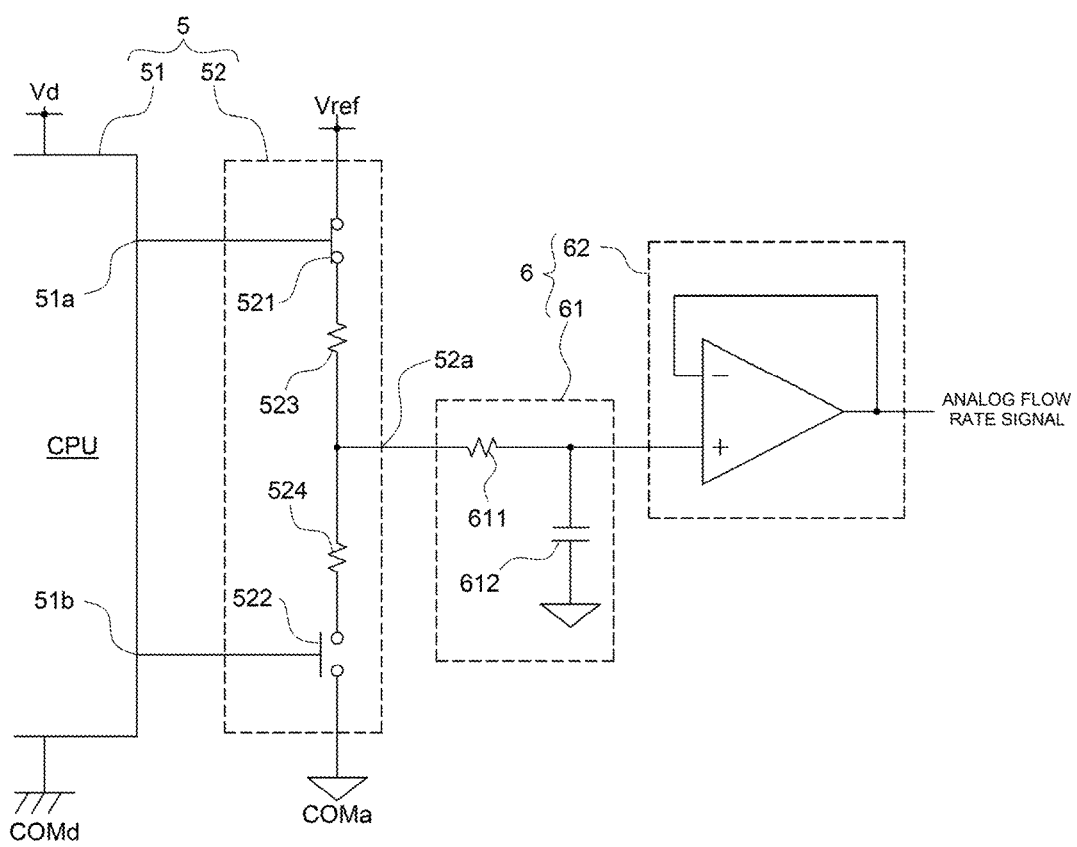
FIG. 3 is an electric circuit diagram for explaining the actions of the analog conversion part in the same embodiment.
Figure 4:
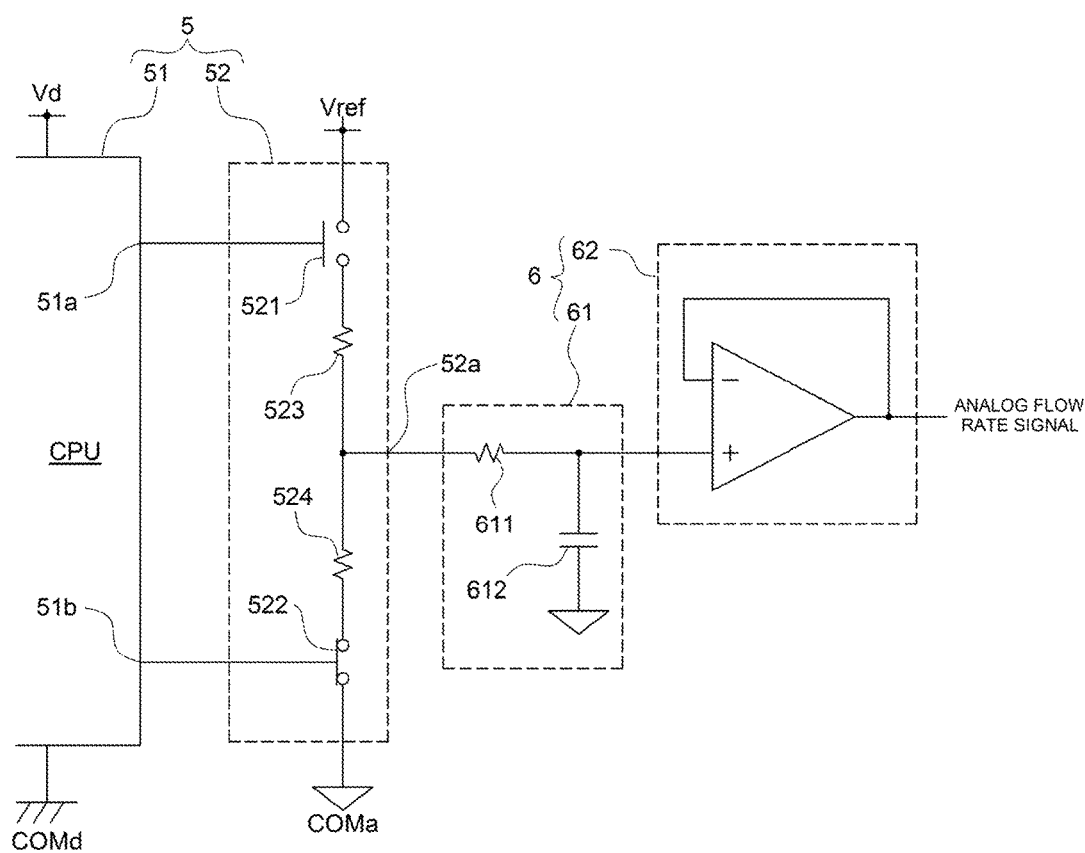
FIG. 4 is an electric circuit diagram for explaining the actions of the analog conversion part in the same embodiment.
Figure 5:
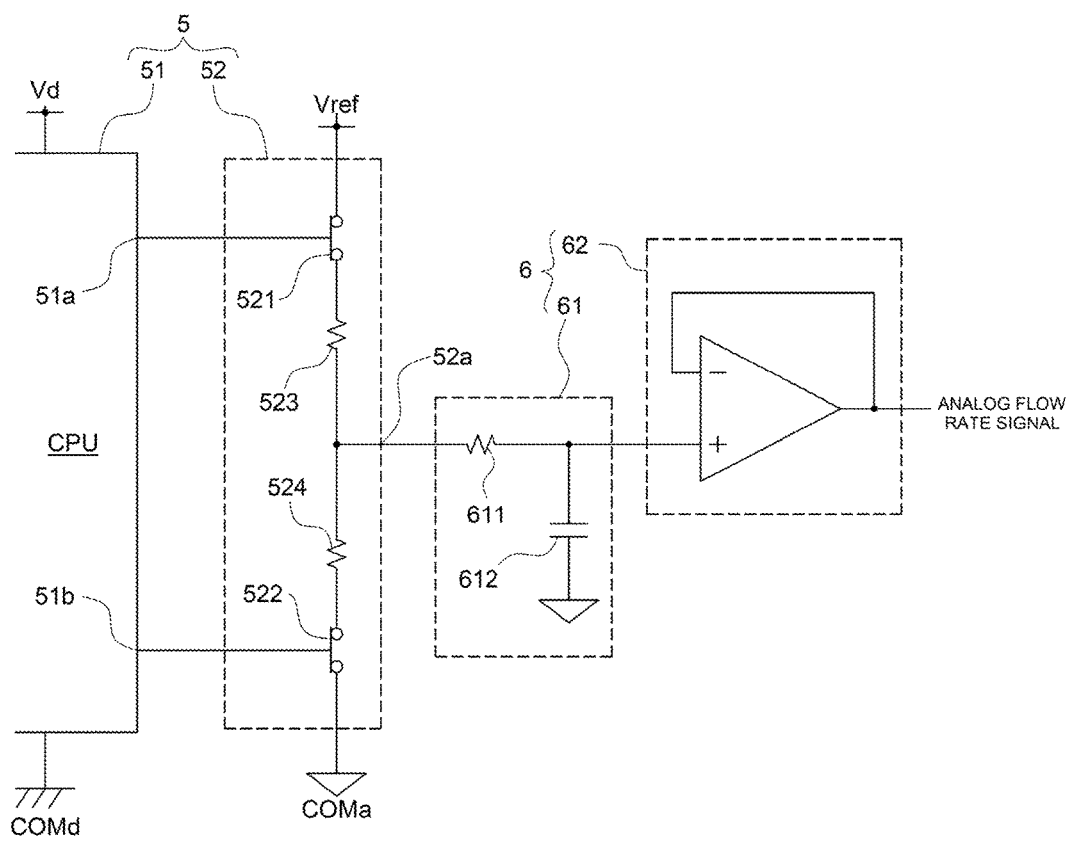
FIG. 5 is an electric circuit diagram for explaining the actions of the analog conversion part in the same embodiment.

Note that in FIGS. 3 to 5, the symbols of the switching elements 521 and 522 are more generalized than those in FIG. 2.

These three output voltages (in descending order) $V_{ref}$, $V_m$, and $V_{com}$ are the above-described three specified voltage levels.

Figure 6:
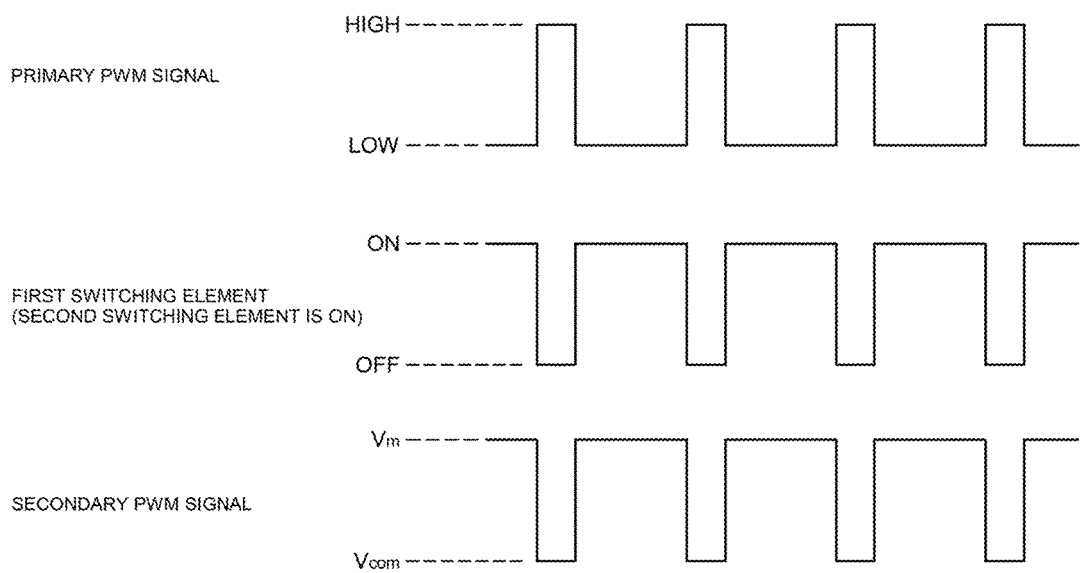
FIG. 6 is a waveform diagram illustrating the relationship between changes in a primary PWM signal, each switching element, and a secondary PWM signal in the same embodiment.

Accordingly, in the primary PWM signal generating circuit 51, when the primary PWM signal is outputted from the first PWM signal output port 51a, and the selection signal of the high level is outputted from the second PWM signal output port 51b, as illustrated in FIG. 6, in the secondary PWM signal generating circuit 52, the second switching element 522 is kept in an ON state, whereas the first switching element 521 is turned OFF/ON in a manner opposite to ON/OFF of the primary PWM signal, and therefore from the output port 52a, the secondary PWM signal having the same frequency as that of the primary PWM signal, a duty ratio (High/Low) inverted from that of the primary PWM signal, and the high and low levels respectively converted to $V_m$ and $V_{com}$ is outputted.

Figure 7:
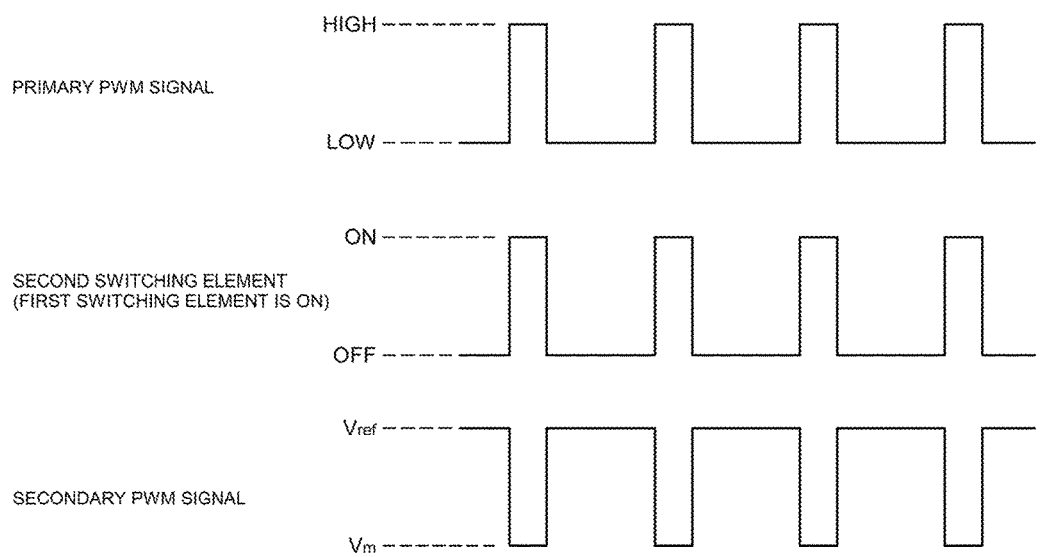
FIG. 7 is a waveform diagram illustrating the relationship between the changes in the primary PWM signal, each switching element, and the secondary PWM signal in the same embodiment.

Also, in the primary PWM signal generating circuit 51, when the primary PWM signal is outputted from the second PWM signal output port 51b, and the selection signal of the low level is outputted from the first PWM signal output port 51a, as illustrated in FIG. 7, in the secondary PWM signal generating circuit 52, the first switching element 521 is kept in an ON state, whereas the second switching element 522 is turned ON/OFF in the same manner as ON/OFF of the primary PWM signal, and therefore from the output port 52a, the secondary PWM signal having the same frequency as that of the primary PWM signal, a duty ratio (High/Low) inverted from that of the primary PWM signal, and the high and low levels respectively converted to $V_{ref}$ and $V_m$ is outputted.

The conversion circuit 6 is one including; an RC filter circuit 61 including a resistive element 611 and a capacitor 612 both having values necessary to smooth the secondary PWM signal to a desired level; and a buffer circuit 62 that is connected to the RC filter circuit 61 and for reducing output impedance. An input port of the RC filter circuit 61 is connected to the output port 52a of the secondary PWM signal generating circuit 52.

Next, the actions of the analog conversion part 4 in the flow rate measuring device 100 will be described.

First, the primary PWM signal generating circuit 51 in the analog conversion part 4 is activated in accordance with the predetermined program (algorithm), and thereby receives the digital flow rate signal to calculates the duty ratio of the primary PWM signal corresponding to the value of the measured flow rate indicated by the digital flow rate signal as well as setting which of PWM signal output port 51a and 51b outputs the primary PWM signal.

A specific description will be given.

When the measured flow rate q is equal to or less than half the maximum measurable flow rate $Q_{max}$, the primary PWM signal generating circuit 51 sets the duty ratio $DT_1$ of the primary PWM signal using the following expression (Expression 1).

$$DT_1 = 1 - \frac{q}{Q_{max}/2} \quad \text{(Expression 1)}$$

Then, the primary PWM signal generating circuit 51 outputs the primary PWM signal from the first PWM signal output port 51a as well as, from the second PWM signal output port 51b, outputting the selection signal of the high level having the duty ratio set to 1 (100%).

In the secondary PWM signal generating circuit 52 having received the primary PWM signal and the selection signal, as described above, the second switching element 522 is kept in the ON state, whereas the first switching element 521 is turned OFF/ON by High/Low of the primary PWM signal, and therefore from the output port 52a, the secondary PWM signal having the same frequency as that of the primary PWM signal, a duty ratio (High/Low) inverted from that of the primary PWM signal, and the high and low levels respectively converted to $V_m$ and $V_{com}$ is outputted.

On the other hand, when the measured flow rate q exceeds half the maximum measurable flow rate $Q_{max}$, the primary PWM signal generating circuit 51 sets the duty ratio $DT_1$ of the primary PWM signal using the following expression (Expression 2).

$$DT_1 = 1 - \frac{q - Q_{max}}{Q_{max}/2} \quad \text{(Expression 2)}$$

Then, the primary PWM signal generating circuit 51 outputs the primary PWM signal from the second PWM signal output port 51b as well as, from the first PWM signal output port 51a, outputting the selection signal of the low level having the duty ratio set to 0 (0%).

In the second PWM signal generating circuit 52 having received the primary PWM signal and the selection signal, as described above, the first switching element 521 is kept in the ON state, whereas the second switching element 522 is turned ON/OFF by High/Low of the primary PWM signal, and therefore from the output port 52a, the secondary PWM signal having the same frequency as that of the primary PWM signal, a duty ratio (High/Low) inverted from that of the primary PWM signal, and the high and low levels respectively converted to $V_{ref}$ and $V_m$ is outputted.

The conversion circuit 6 receives the secondary PWM signal generated as described above to smooth the secondary PWM signal through the RC filter circuit 61, and then converts the output impedance through the buffer circuit 62 to output the resulting signal as the analog flow rate signal.

Figure 8:
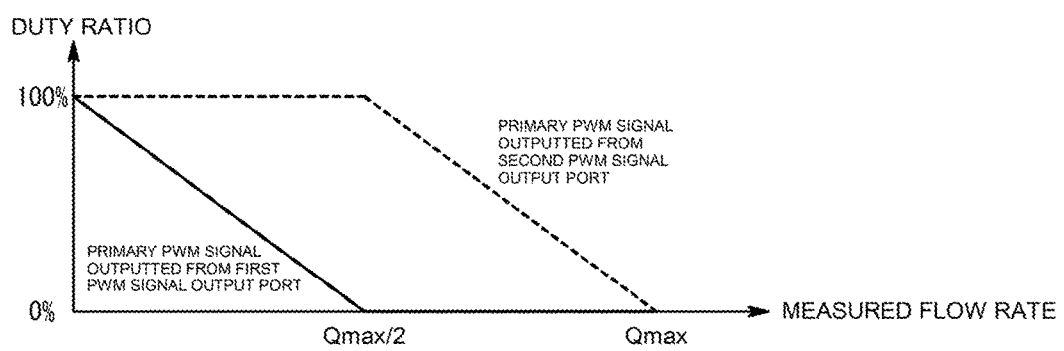
FIG. 8 is a relationship diagram illustrating the relationship between a measured flow rate and the duty ratio of the primary PWM signal in the same embodiment.
Figure 9:
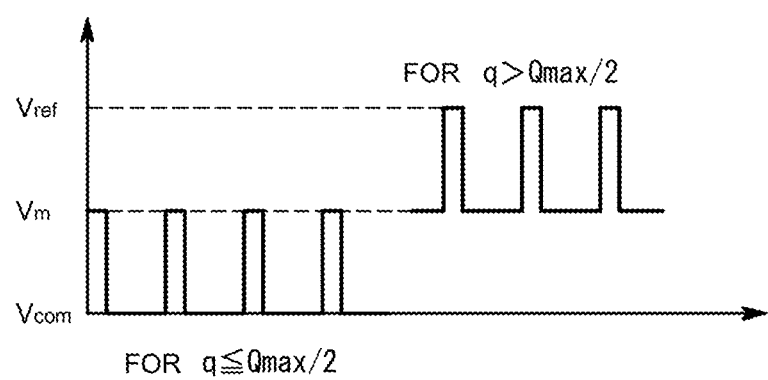
FIG. 9 is a waveform diagram illustrating the waveform of the secondary PWM signal in the same embodiment.

FIG. 8 illustrates a change in the duty ratio of a signal outputted from each of the PWM signal output port 51a and 51b in response to the measured flow rate indicated by the digital flow rate signal. Also, FIG. 9 illustrates a change in the secondary PWM signal in response to the measured flow rate indicated by the digital flow rate signal.

Since in the flow rate measuring device 100 configured as described, the variation width of the PWM signal becomes ½, a residual ripple voltage also becomes ½, and therefore the tradeoff between residual ripple and output response speed can be made equal to ½.

Also, since the specified voltages are set on the basis of the analog constant voltage $V_{ref}$ and the analog common voltage $V_{com}$ set separately from the digital power supply voltage $V_d$ and the digital common voltage, the high and low levels of the PWM signal to be outputted are stabilized, and the analog flow rate signal with high accuracy can be obtained while avoiding the effect of the digital circuit.

Note that the present invention is not limited to the above-described embodiment.

For example, when the input impedance of the RC filter circuit 61 cannot be ensured sufficiently large as compared with the output impedance of the secondary PWM signal generating circuit 52 (due to a shift problem caused by bias current to the buffer circuit 62 in the subsequent stage or leakage current to the capacitor and/or in terms of smoothing function or the like), more specifically, when as compared with the values of the resistive elements 523 and 524 of the secondary PWM signal generating circuit 52, the resistive value of the RC filter circuit 61 cannot be ensured sufficiently large, changing the time constant of the RC filter circuit 61 to change the duty ratio of the PWM signal linearly with respect to the measured flow rate as illustrated in FIG. 8 may cause the shift between the value (voltage value) of the analog flow rate signal and the value of the digital flow rate signal.

Figure 10:
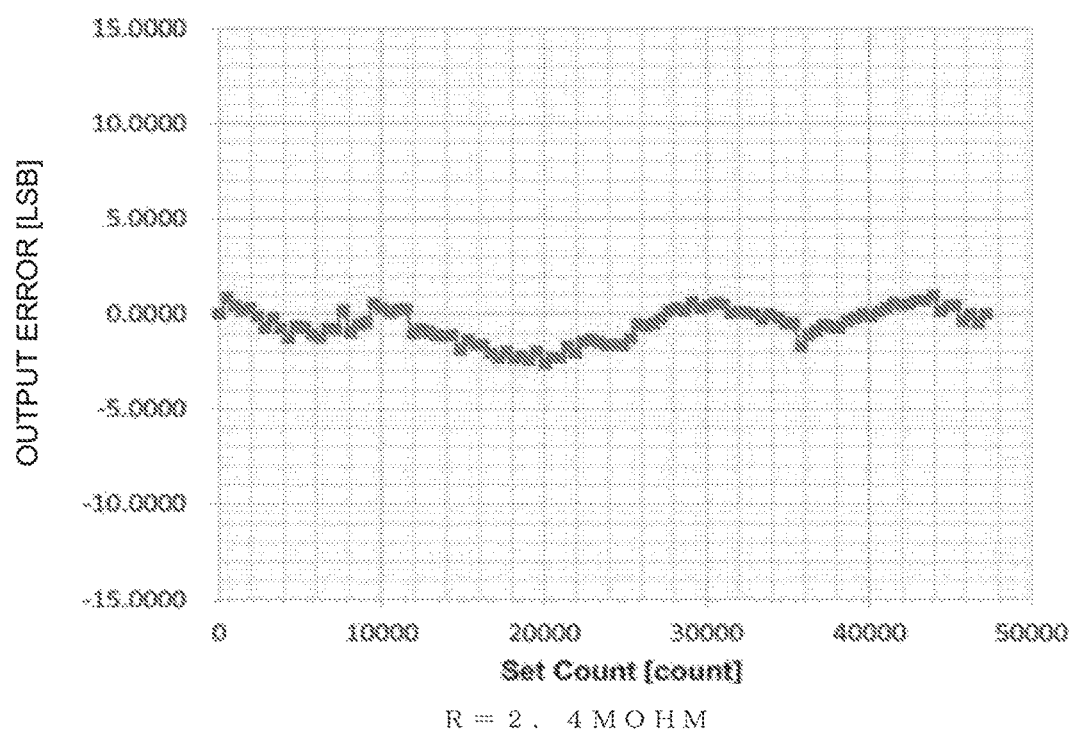
FIG. 10 is a graph illustrating that the measured flow rate and the duty ratio are shifted from a linear relationship due to a change in time constant of an RC filter circuit in the same embodiment.
Figure 11:
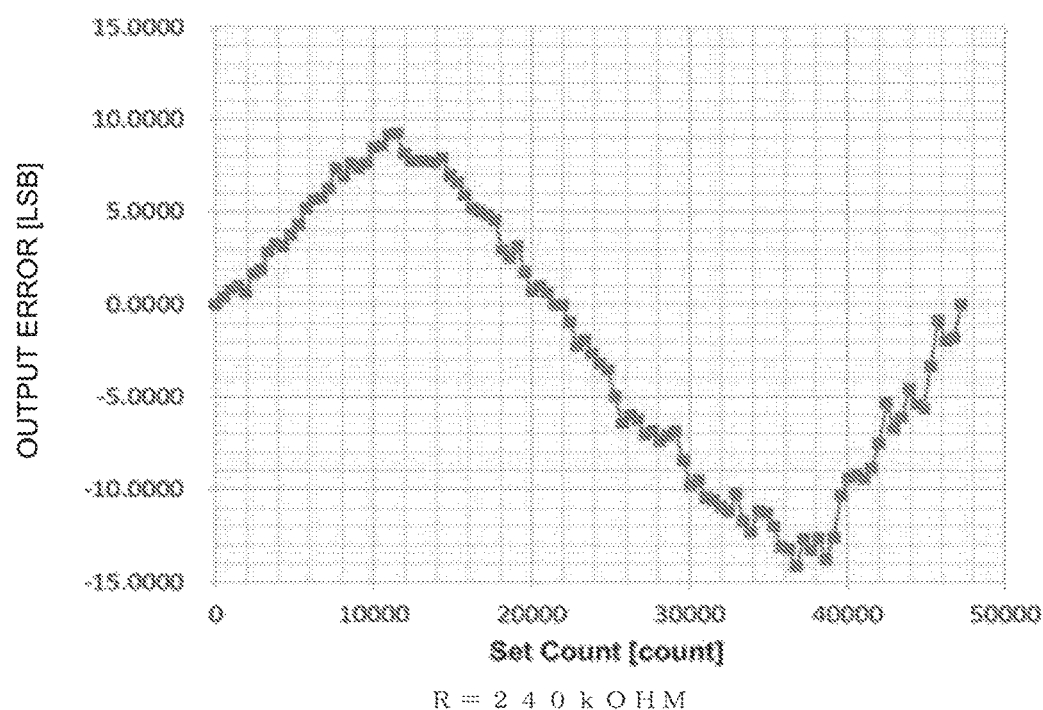
FIG. 11 is a graph illustrating that the measured flow rate and the duty ratio are shifted from the linear relationship due to a change in time constant of an RC filter circuit in the same embodiment.

The amount of the shift is illustrated in FIG. 10 or 11. It turns out that in FIG. 11 where the resistance value of the RC filter is smaller, the shift is larger.

For this reason, in order to match them with each other, it is also possible to determine the duty ratio of the PWM signal from the value of the digital measured flow rate using not a linear expression but, for example, a multidimensional function or a memory map.

Figure 12:
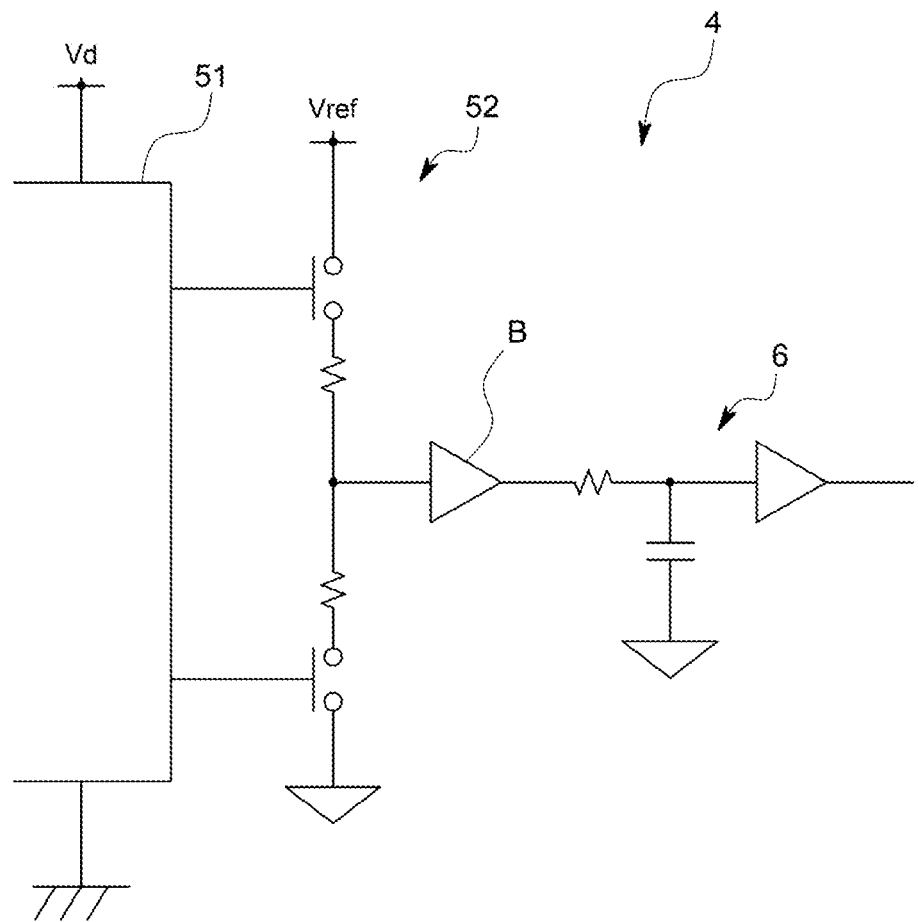
FIG. 12 is an electric circuit diagram illustrating an analog conversion part in another embodiment of the present invention.

Also, the balance between the output impedance of the secondary PWM signal generating circuit 52 and the input impedance of the conversion circuit 6 may be kept by, for example, as illustrated in FIG. 12, inserting a buffer B between the secondary PWM signal generating circuit 52 and the conversion circuit 6. Note that in this case, the accuracy of the value of the analog flow rate signal may be deteriorated due to the characteristics of the buffer B, such as response speed, drift, and/or offset. Conversely, it turns out that the above-described embodiment without the buffer B makes it possible to obtain the effect of being able to secure response speed and improve accuracy.

In the above-described embodiment, the number of the specified voltage levels is three, i.e., in addition to the analog constant voltage $V_{ref}$ and the analog common voltage $V_{com}$, the intermediate voltage $V_m$ intermediate between them; however, the number of specified voltage levels may be increased to four or more.

Figure 13:
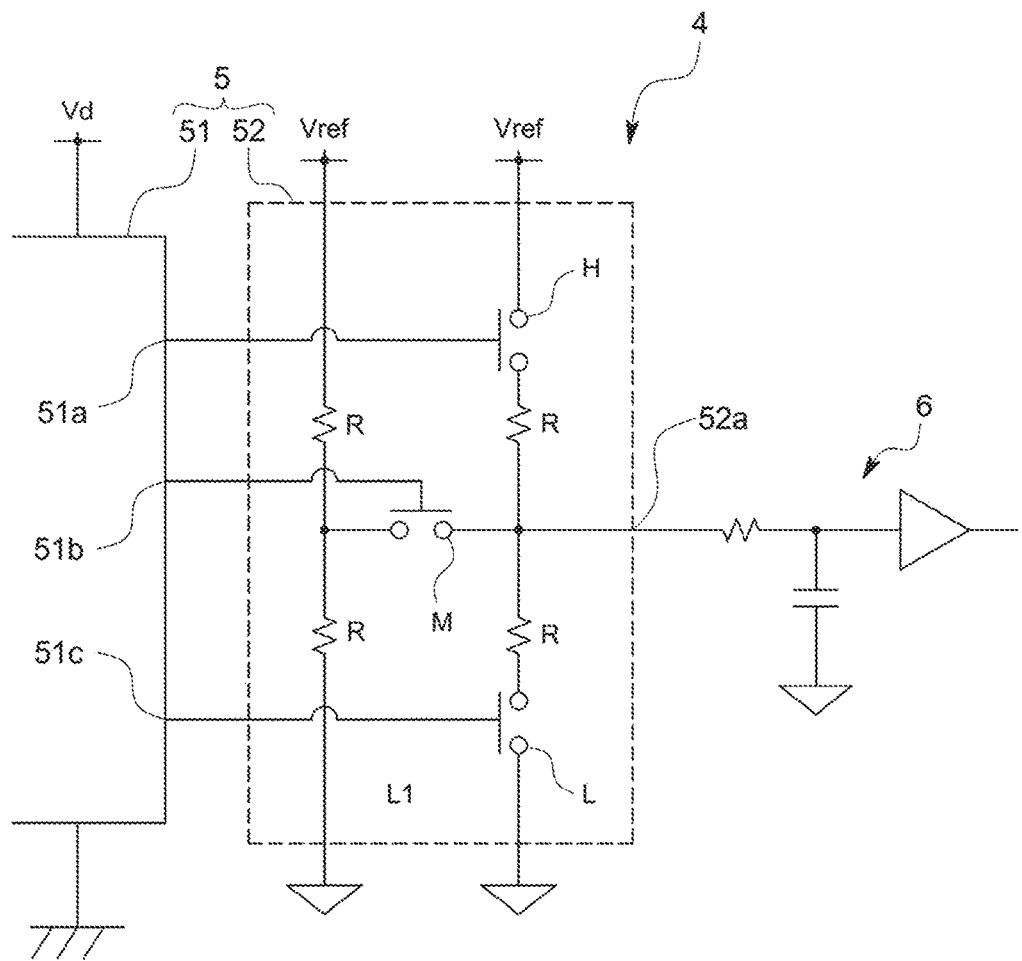
FIG. 13 is an electric circuit diagram illustrating an analog conversion part in still another embodiment of the present invention.
Figure 14:
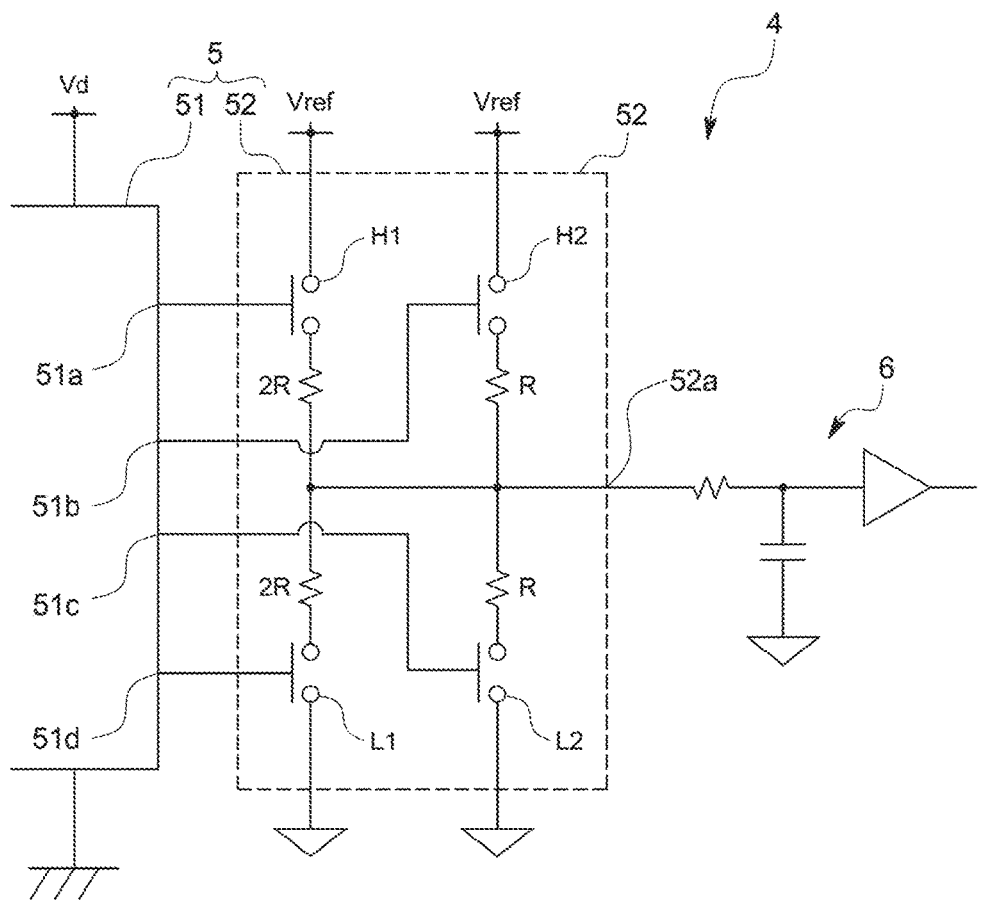
FIG. 14 is an electric circuit diagram illustrating an analog conversion part in yet another embodiment of the present invention.

FIGS. 13 and 14 illustrate specific examples where the number of specified voltage level is increased to four and five, respectively.

In FIG. 13, the secondary PWM signal generating circuit 52 is adapted to be one having; four resistive elements having mutually the same resistance value (R); and three switching elements H, M, and L. In addition, in the primary PWM signal generating circuit 51, three first PWM signal output ports 51a, 51b, and 51c respectively adapted to control the switching elements H, M, and L are provided.

The primary PWM signal generating circuit 51 is activated in accordance with a predetermined program (algorithm) as follows.

(1) As listed in the table below the circuit diagram of FIG. 13, when the digital measured flow rate exceeds ⅔ of the maximum measurable flow rate $Q_{max}$, the primary PWM signal generating circuit 51 turns ON the switching element H and turns OFF the switching element L as well as turning ON/OFF the switching element M on the basis of the primary PWM signal, and thereby makes the secondary PWM signal generating circuit 52 generate the secondary PWM signal having a high level $V_{ref}$ and a low level ⅔$V_{ref}$.

(2) When the digital measured flow rate is ⅓ to ⅔ of the maximum measurable flow rate $Q_{max}$, the primary PWM signal generating circuit 51 turns ON the switching element M as well as turning ON/OFF the switching elements H and L on the basis of the primary PWM signal, and thereby makes the secondary PWM signal generating circuit 52 generate the secondary PWM signal having a high level ⅔$V_{ref}$ and a low level ⅓$V_{ref}$.

(3) When the digital measured flow rate is ⅓ or less of the maximum measurable flow rate $Q_{max}$, the primary PWM signal generating circuit 51 turns OFF the switching element H and turns ON the switching element L as well as turning ON/OFF the switching element M on the basis of the primary PWM signal, and thereby makes the secondary PWM signal generating circuit 52 generate the secondary PWM signal having a high level ⅓$V_{ref}$ and a low level $V_{com}$ (0).

In FIG. 14, the secondary PWM signal generating circuit 52 is adapted to be one having four switching elements H1, H2, L1, and L2 in addition to two resistive elements having mutually the same resistance value (2R) and two resistive elements having a resistance value (R) half that resistance value (2R). In addition, in the primary PWM signal generating circuit 51, four first PWM signal output ports 51a, 51b, 51c, and 51d respectively adapted to control the switching elements H1, H2, L1, and L2 are provided.

The PWM signal generating circuit 5 including the primary PWM signal generating circuit 51 and the secondary PWM signal generating circuit 52 is activated as listed in the table below the circuit diagram of FIG. 14, and thereby (1) when the digital measured flow rate exceeds ¾ of the maximum measurable flow rate $Q_{max}$, generates the secondary PWM signal having a high level $V_{ref}$ and a low level ¾$V_{ref}$, (2) when the digital measured flow rate is ¾ to ½ of the maximum measurable flow rate $Q_{max}$, generates the secondary PWM signal having a high level ¾$V_{ref}$ and a low level ½$V_{ref}$, (3) when the digital measured flow rate is ½ to ¼ of the maximum measurable flow rate $Q_{max}$, generates the secondary PWM signal having a high level ½$V_{ref}$ and a low level ¼$V_{ref}$, and (4) when the digital measured flow rate is ¼ or less of the maximum measurable flow rate $Q_{max}$, generates the secondary PWM signal having a high level ¼$V_{ref}$ and a low level $V_{com}$ (0).

Functions of the PWM signal generating circuit 5 fulfilled when generalizing the specified voltage levels and the number of the specified voltage levels can be summarized as follows.

The PWM signal generating circuits 5 compares the value q of the digital flow rate signal and the specified voltage levels $V_0, V_1, \ldots, V_k, \ldots, V_n$ (n is an integer equal to or more than 2, and $V_k > V_{k-1}$), searches for j meeting $V_j \geq s \cdot q > V_{j-1}$ (j is an integer not less than 1 and not more than n, and s is a predetermined coefficient), and outputs the PWM signal having a duty ratio $(s \cdot q - V_{j-1})/(V_j - V_{j-1})$, a low level $V_{j-1}$, and a high level $V_j$.

When doing this, in order to obtain the duty ratio from the value q of the digital flow rate signal, a linear expression of $(s \cdot q - V_{j-1})/(V_j - V_{j-1})$ is used. However, as described above, in the case where the shift occurs due to the difference in impedance, in place of the linear expression, for example, a multidimensional function or a memory map may be used to determine the duty ratio.

Also, the values of any adjacent specified voltage levels are not required to be the same. In addition, it is not necessarily required to use adjacent specified voltage levels to set the high and low levels of the secondary PWM signal.

Figure 15:
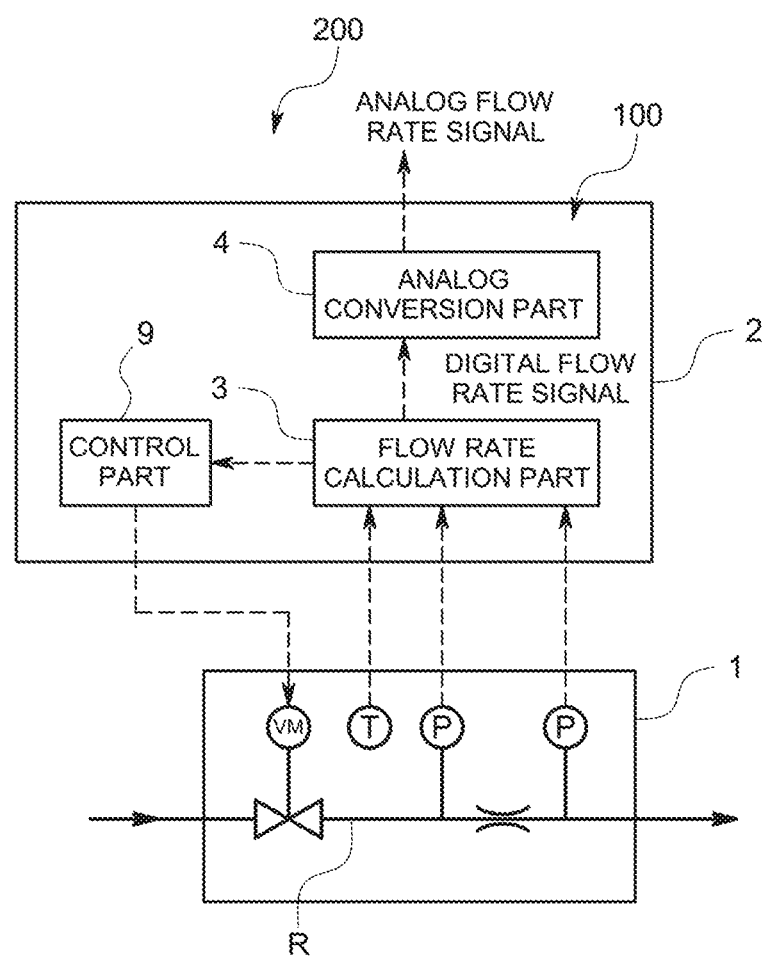
FIG. 15 is a schematic diagram illustrating a flow rate controller in still yet another embodiment.

Further, a flow rate controller 200 may be configured using the flow rate measuring device 100. A possible specific configuration is, for example, one that as illustrated in FIG. 15, includes the flow rate measuring device 100, a flow rate control valve VM, and a control part 9 adapted to feedback control the flow rate control valve VM so as to bring a measured flow rate measured by the flow rate measuring device 100 close to a predetermined target flor rate.

LIST OF REFERENCE CHARACTERS

100: Flow rate measuring device
4: Analog conversion part
5: PWM signal generating circuit
51: Primary PWM signal generating circuit
52: Secondary PWM signal generating circuit
6: Conversion circuit

The invention claimed is:

1. A flow rate measuring device comprising:
an analog conversion part adapted to convert a digital flow rate signal indicating a measured flow rate value to an analog flow rate signal indicating the measured flow rate value, wherein the analog conversion part comprises:
a pulse width modulation (PWM) signal generating circuit configured to output three or more predetermined specified voltage levels, and on a basis of the measured flow rate value indicated by the digital flow rate signal, select two specified voltage levels from among the specified voltage levels, as well as on the basis of the measured flow rate value indicated by the digital flow rate signal, setting a duty ratio to generate a PWM signal of which a high level and a low level are the two specified voltage levels, respectively; and
a conversion circuit that smooths the PWM signal outputted from the PWM signal generating circuit to convert to the analog flow rate signal, and
wherein the PWM signal generating circuit comprises:
a primary PWM signal generating circuit that on a basis of a value of the digital flow rate signal:
generates a primary PWM signal; and
selects the two specified voltage levels from among the three or more specified voltage levels; and
a secondary PWM signal generating circuit configured to output the three or more specified voltage levels, and generate a secondary PWM signal as the PWM signal obtained by converting a high level and a low level of the primary PWM signal to the two specified voltage levels, respectively.

2. The flow rate measuring device according to claim 1, wherein
the PWM signal generating circuit is one that selects two adjacent specified voltage levels.

3. The flow rate measuring device according to claim 2, wherein
the adjacent specified voltage levels are all substantially equally set.

4. The flow rate measuring device according to claim 1, wherein
the PWM signal generating circuit is one that sets the duty ratio with a variation in smoothing time constant of the conversion circuit as a parameter.

5. The flow rate measuring device according to claim 1, wherein
the PWM signal generating circuit:
compares a value q of the digital flow rate signal and the specified voltage levels $V_0, V_1, V_k, \ldots, V_n$ (n is an integer equal to or more than 2, and $V_k > V_{k-1}$);
searches for j meeting $V_j \geq s \cdot q > V_{j-1}$ (j is an integer not less than 1 and not more than n, and s is a predetermined coefficient); and
outputs the PWM signal having a duty ratio $(s \cdot q - V_{j-1})/(V_j - V_{j-1})$, a low level $V_{j-1}$, and a high level $V_j$.

6. The flow rate measuring device according to claim 5, wherein
the PWM signal generating circuit sets the duty ratio of the PWM signal to a value shifted from $(s \cdot q - V_{j-1})/(V_j - V_{j-1})$ on a basis of a balance between output impedance of the PWM signal generating circuit and input impedance of the conversion circuit.

7. A flow rate controller comprising:
the flow rate measuring device according to claim 1; a flow rate control valve; and a control part adapted to control the flow rate control valve so as to bring a measured flow rate measured by the flow rate measuring device close to a predetermined target flow rate.

* * * * *